(12) United States Patent
Chung

(10) Patent No.: US 11,143,348 B2
(45) Date of Patent: Oct. 12, 2021

(54) GAS PIPE JOINT

(71) Applicant: Greatness Sanitary Industrial CO., Changhua County (TW)

(72) Inventor: Wei-cheng Chung, Changhua County (TW)

(73) Assignee: Greatness Sanitary Industrial Co., Changhua County (TW)

( * ) Notice: Subject to any disclaimer, the term of this patent is extended or adjusted under 35 U.S.C. 154(b) by 181 days.

(21) Appl. No.: 16/657,098

(22) Filed: Oct. 18, 2019

(65) Prior Publication Data

US 2021/0116063 A1    Apr. 22, 2021

(51) Int. Cl.
| | | |
|---|---|---|
| *F16L 37/14* | (2006.01) | |
| *F16L 27/02* | (2006.01) | |
| *F16L 21/02* | (2006.01) | |
| *F16L 27/08* | (2006.01) | |
| *F16L 15/00* | (2006.01) | |

(52) U.S. Cl.
CPC .............. *F16L 37/14* (2013.01); *F16L 21/02* (2013.01); *F16L 27/023* (2013.01); *F16L 15/001* (2013.01); *F16L 27/0861* (2013.01)

(58) Field of Classification Search
CPC ......... F16L 37/14; F16L 27/023; F16L 21/02; F16L 27/0861; F16L 15/001; F16L 25/065; F16L 27/0837; F16L 27/0816
USPC ................................................ 285/275, 276
See application file for complete search history.

(56) References Cited

U.S. PATENT DOCUMENTS

| | | | | |
|---|---|---|---|---|
| 4,079,969 A | * | 3/1978 | Wilson ................ | F16L 27/0816 285/276 |
| 4,804,206 A | * | 2/1989 | Wood .................. | F16L 27/0841 285/13 |
| 5,553,893 A | | 9/1996 | Foti | |
| 8,146,954 B2 | * | 4/2012 | Su ........................ | F16C 11/0642 285/261 |
| 9,322,497 B1 | * | 4/2016 | Chung ................ | F16L 27/0861 |

FOREIGN PATENT DOCUMENTS

| | | | | |
|---|---|---|---|---|
| CA | 2353660 A1 | * | 1/2002 | ........... F16L 27/0828 |
| FR | 2784735 A1 | * | 4/2000 | ............. F16L 37/138 |
| TW | M513304 U | | 12/2015 | |

* cited by examiner

*Primary Examiner* — James M Hewitt, II
(74) *Attorney, Agent, or Firm* — Alan D. Kamrath; Karin L. Williams; Mayer & Williams PC

(57) ABSTRACT

A gas pipe joint contains: a connection pipe, a first threaded pipe, and a second threaded pipe. The connection pipe includes a first part and a second part, the first part has a first threaded orifice, and the second part has a second threaded orifice. The first threaded pipe includes a first coupling section, a first nut section, and a second coupling section. The second threaded pipe includes a second nut section and a third coupling section, the second nut section has a second screwing portion, and the third coupling section has at least one second recessed portion and a second groove. The third coupling section has a second shoulder. The second shoulder has a second lower gasket. The first groove has two first loops, and the second groove has two second loops.

6 Claims, 6 Drawing Sheets

GAS PIPE JOINT

FIELD OF THE INVENTION

The present invention relates to gas pipe connection equipment, and more particularly to a gas pipe joint.

BACKGROUND OF THE INVENTION

A gas pipe joint is applicable for industry or a water heater so as to connect multiple pipes having an angle. However, the gas pipe joint has two parts in which a right angle or a non-right angle is defined, thus limiting the gas pipe joint. For example, when moving a heater, the gas pipe joint and a plastic hose cannot be connected tightly to cause a gas leakage.

A connector for gas appliances is disclosed in U.S. Pat. No. 5,553,893 and is rotatable, but the connector can only be rotated in a single direction to cause a gas leakage.

Conventional gas pipe joints are disclosed in TW Utility Model No. M513304 and match with a gas supply and a machine connected with the gas supply by a plastic hose. A first threaded pipe is rotated relative to the first part of the connection pipe, and the second threaded pipe is rotated relative to the second part of the connection. Thereby, the gas pipe joints are rotated in two different directions so as to move the machine and the gas supply, and the gas pipe joints and the plastic hose are connected tightly to avoid a gas leakage.

However, a first groove and a second groove have multiple steel balls accommodated therein and stopped by multiple screw bolts respectively so that the first and second threaded pipes can be rotated in the two different directions. However, it is complicated to fix the multiple steel balls in the first groove and the second groove, thus having poor assembly efficiency.

The present invention has arisen to mitigate and/or obviate the afore-described disadvantages.

SUMMARY OF THE INVENTION

The primary aspect of the present invention is to provide a gas pipe joint which contains a connection pipe, a first threaded pipe, and a second threaded pipe, wherein the two first loops are mounted on the first threaded pipe and the first groove of the connection pipe, and two second loops are fixed on the connection pipe and the first groove of the second threaded pipe so as to connect the gas pipe joint easily.

Another aspect of the present invention is to provide a gas pipe joint which contains a connection pipe, a first threaded pipe, a second threaded pipe, a first sleeve, and a second sleeve, wherein the connection pipe is a two-way pipe and includes a first outer screwing portion and a second outer screwing portion, the first threaded pipe is connected with the connection pipe and the first sleeve is fitted on the first threaded pipe and the connection pipe tightly; the second threaded pipe is connected with the connection pipe and the second sleeve is fitted on the second threaded pipe and the connection pipe, and the first threaded pipe includes two first loops, the second threaded pipe includes two second loops, such that the connection pipe, the first threaded pipe, and the second threaded pipe have a fixed specification, and the first sleeve and the second sleeve have a fixed specification so as to reduce maintenance cost as replacing the gas pipe joint.

DETAILED DESCRIPTION OF THE PREFERRED EMBODIMENTS

Figure 1:
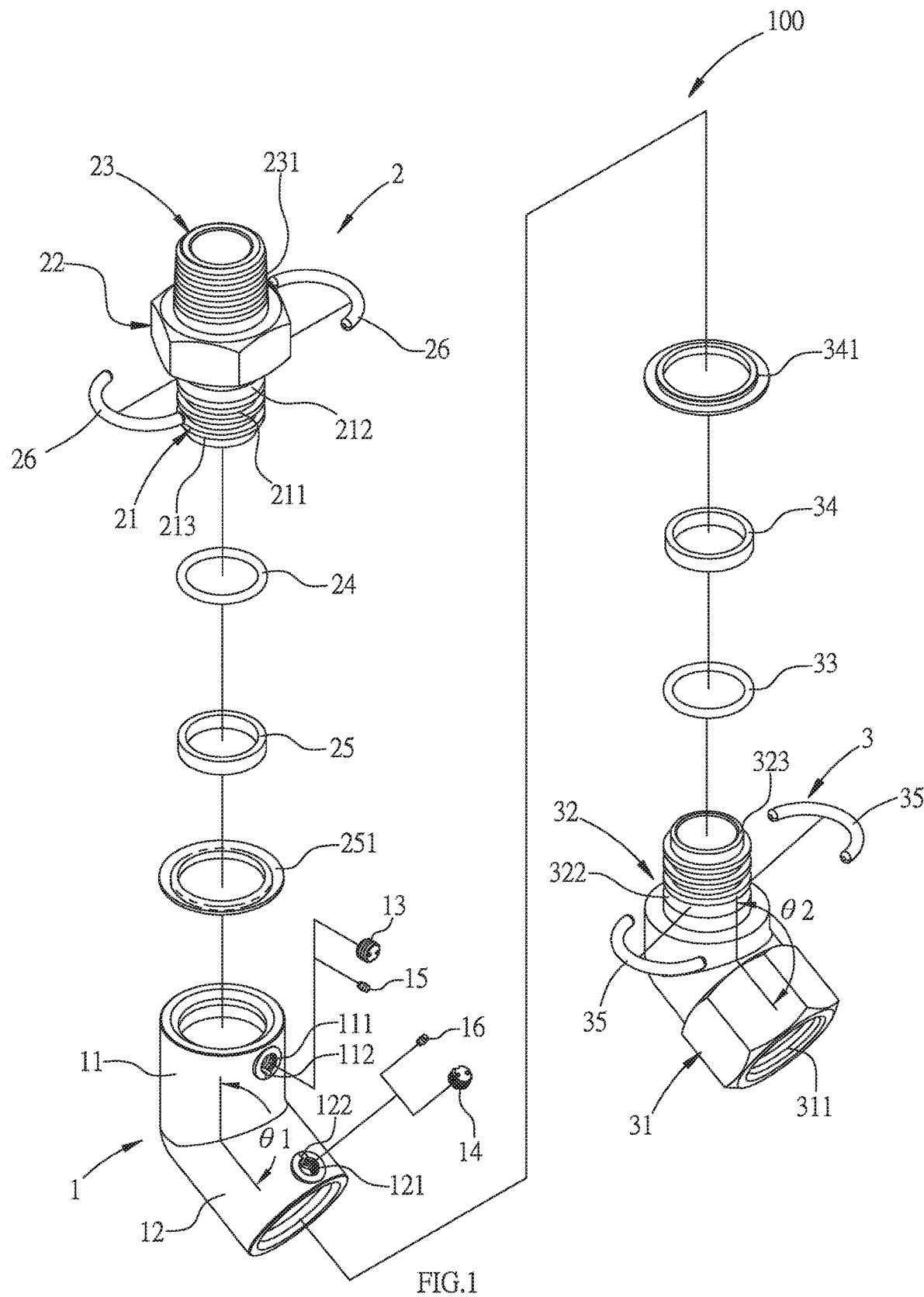
FIG. 1 is a perspective view showing the exploded components of a gas pipe joint according to a first embodiment of the present invention.
Figure 2:
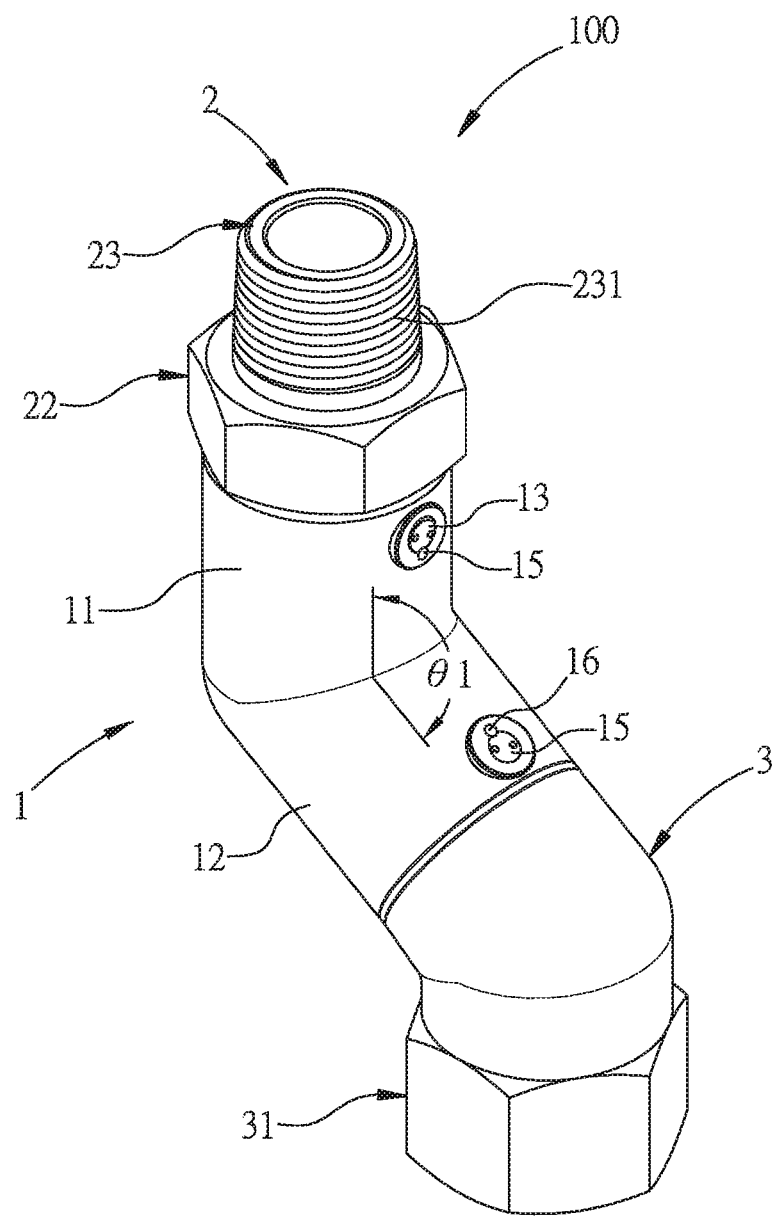
FIG. 2 is a perspective view showing the assembly of the gas pipe joint according to the first embodiment of the present invention.
Figure 3:
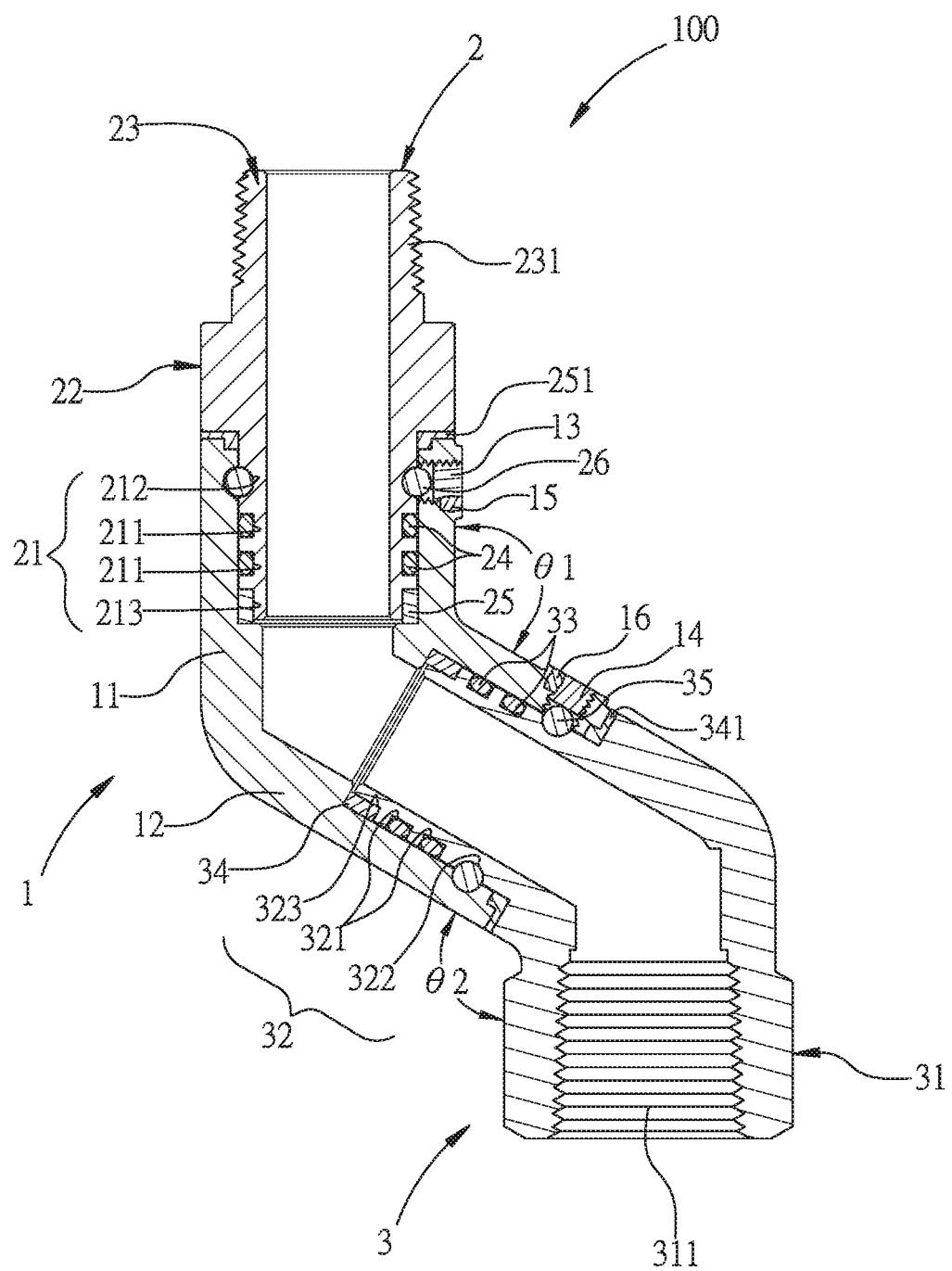
FIG. 3 is a cross sectional view showing the assembly of the gas pipe joint according to the first embodiment of the present invention.

With reference to FIGS. 1-3, a gas pipe joint 100 according to a first embodiment of the present invention comprises: a connection pipe 1, a first threaded pipe 2, and a second threaded pipe 3.

The connection pipe 1 includes a first part 11 and a second part 12 communicating with the first part 11, and a first angle θ1 is defined between the first part 11 and the second part 12, wherein the first angle θ1 is an obtuse angle. The first part 11 has a first threaded orifice 111 defined on a side surface of the first part 1 adjacent to the second part 12, the second part 12 has a second threaded orifice 121 formed on a side surface of the second part 12 proximate to the first part 11, the first threaded orifice 111 is configured to removably screw with a first screw bolt 13, and the second threaded orifice 121 is configured to removably screw with a second bolt 14.

Referring to FIGS. 1-3, the first threaded orifice 111 has a first notch 112 defined on a peripheral side thereof, the second threaded orifice 121 has a second notch 122 formed on a peripheral side thereof, wherein the first notch 112 is configured to receive a first stopper 15, and the second notch 122 is configured to accommodate a second stopper 16, such that gas does not leak from the connection pipe 1.

As shown in FIGS. 1-3, the first threaded pipe 2 includes a first coupling section 21, a first nut section 22, and a second coupling section 23, two ends of the first nut section 22 are in communication with the first coupling section 21 and the second coupling section 23 respectively, the first coupling section 21 has at least one first recessed portion 211 and a first groove 212 which are formed on an outer wall of the first coupling section 21. In this embodiment, two first recessed portions 211 are formed on the outer wall of the first coupling section 21. The first coupling section 21 has a first shoulder 213 formed around a bottom of the first coupling section 21 and is accommodated in the first coupling section 21, each of the two first recessed portions 211 is fitted with a first ring 24, the first shoulder 213 has a first upper gasket 25 fitted thereon, and a first lower gasket 251 is defined between a bottom of the first coupling section 21 and the first part 11 so that the first part 11 is connected with the first coupling section 21 tightly. The second coupling section 23 has a first screwing portion 231 formed on an outer wall thereof, the first groove 212 corresponds to the first threaded orifice 111 and has two first loops 26 mounted on the first groove 212, the first screw bolt 13 is configured to stop the two first loops 26 so that the first threaded pipe 2 is rotated relative to the first coupling section 21 in a first rotation direction.

The second threaded pipe 3 includes a second nut section 31 and a third coupling section 32 communicating with the second nut section 31, wherein a second angle θ2 is defined between the second nut section 31 and the third coupling section 32, wherein the second angle θ2 is an obtuse angle. The second nut section 31 has a second screwing portion 311 formed on an inner wall of the second nut section 31. The third coupling section 32 has at least one second recessed portion 321 and a second groove 322 which are formed on an outer wall of the third coupling section 32. In this embodiment, two second recessed portions 321 are formed on the outer wall of the third coupling section 32. The third coupling section 32 has a second shoulder 323 formed around a top of the third coupling section 32 and is accommodated in the second part 12, wherein each of the two second recessed portions 321 is fitted with a second ring 33, the second shoulder 323 has a second lower gasket 34 fitted thereon, a second upper gasket 341 is defined between a top of the second coupling section 32 and the second part 12 so that the second part 12 is connected with the third coupling section 32 tightly. The second groove 322 corresponds to the second threaded orifice 121 and has two second loops 35 mounted thereon, the second bolt 14 is configured to stop the two second loops 35 so that the second threaded pipe 3 is rotated relative to the second part 12 in a second rotation direction different from the first direction.

Thereby, the two first loops 26 are retained with the first groove 212, and the two second loops 35 are engaged with the second groove 322, thus connecting the gas pipe joint efficiently, moving a machine (not shown) and a gas supply easily.

Figure 4:
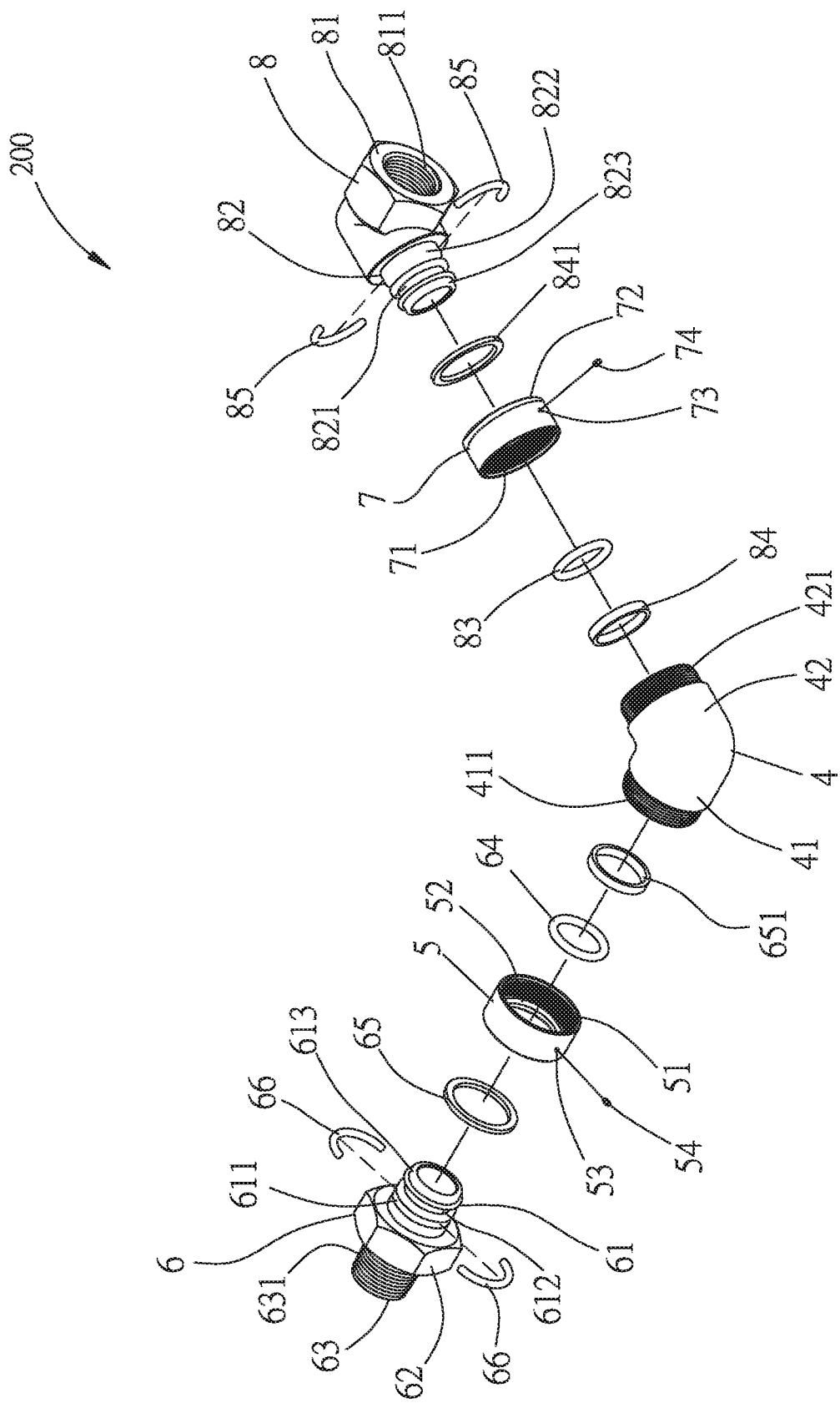
FIG. 4 is a perspective view showing the exploded components of a gas pipe joint according to a second embodiment of the present invention.
Figure 5:
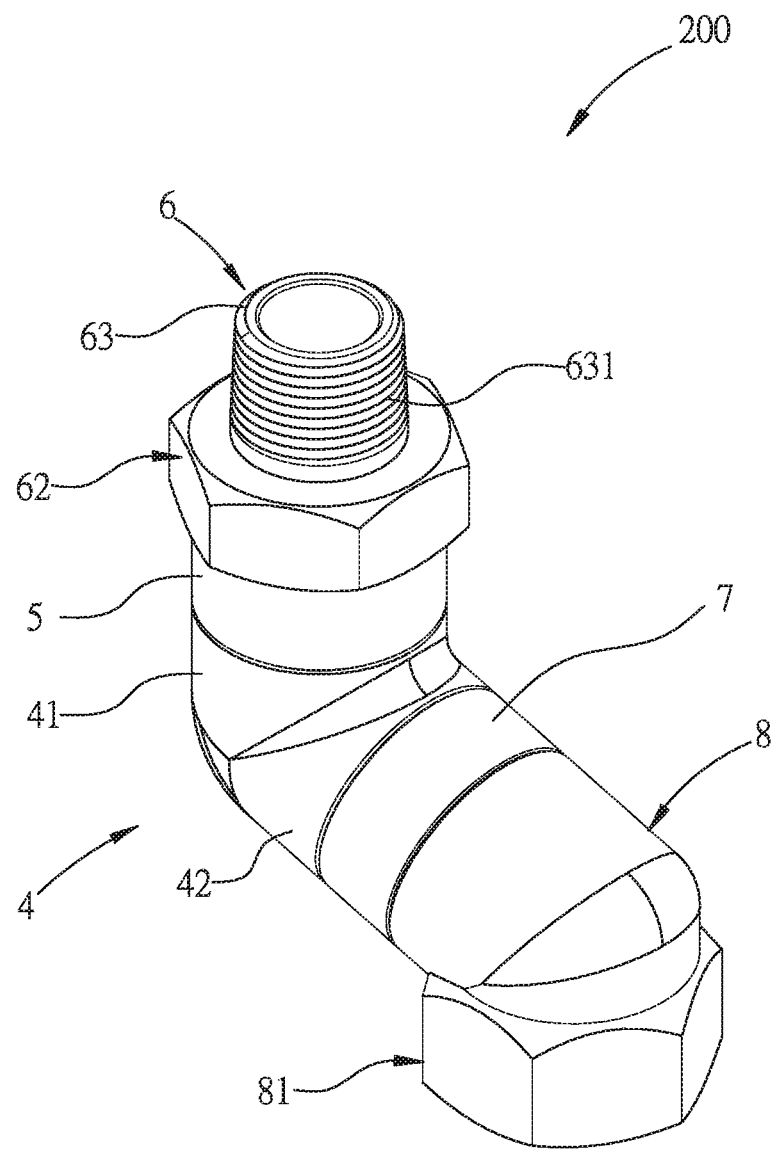
FIG. 5 is a perspective view showing the assembly of the gas pipe joint according to the second embodiment of the present invention.
Figure 6:
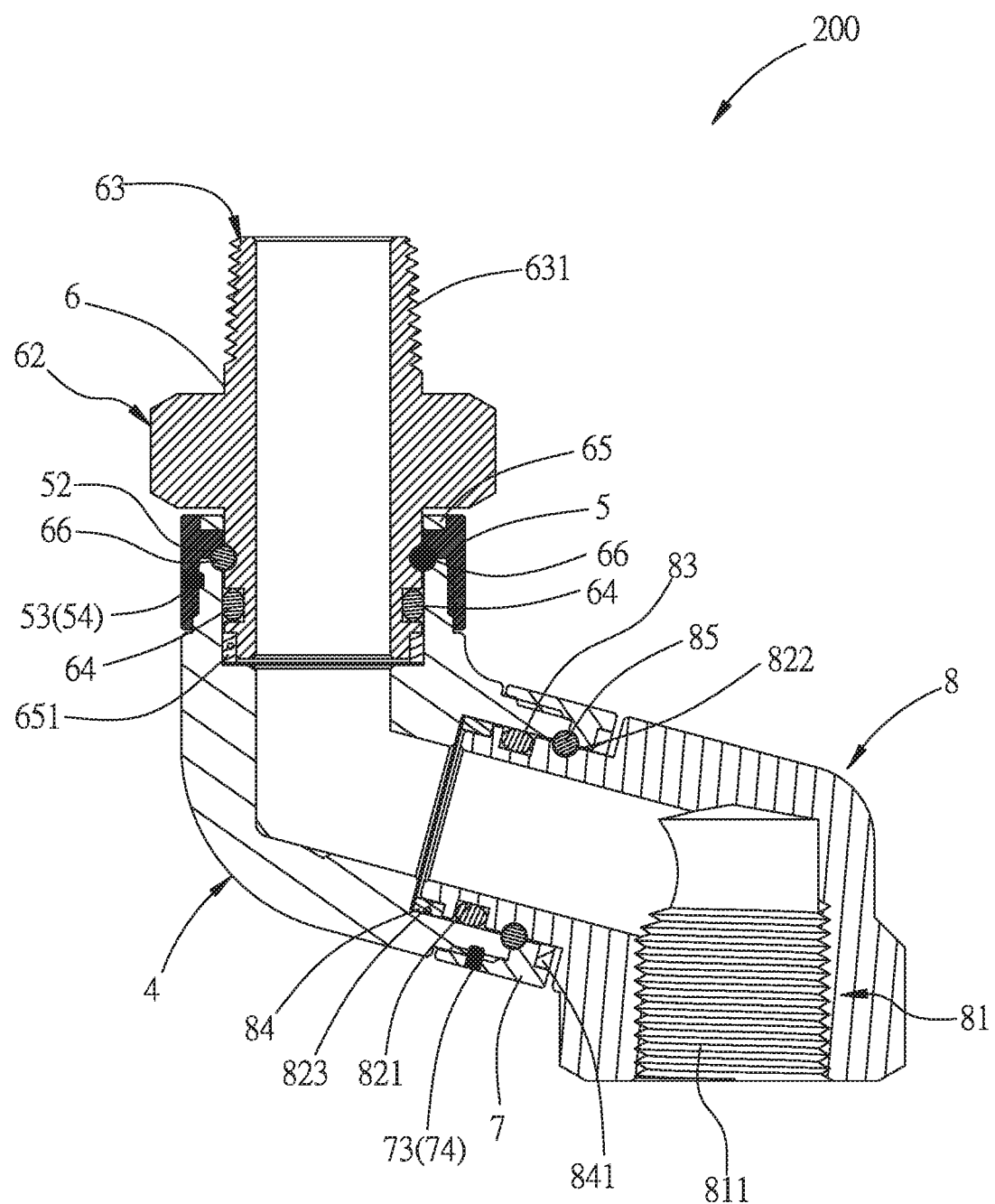
FIG. 6 is a cross sectional view showing the assembly of the gas pipe joint according to the second embodiment of the present invention.

With reference to FIGS. 4-6, a gas pipe joint 200 according to a second embodiment of the present invention comprises: a connection pipe 4, a first sleeve 5, a first threaded pipe 6, a second sleeve 7, and a second threaded pipe 8.

Referring to FIGS. 4-6, the connection pipe 4 is a two-way pipe.

The connection pipe 4 includes a first part 41 and a second part 42 communicating with the first part 41, and a first angle θ1 is defined between the first part 41 and the second part 42, wherein the first angle θ1 is an obtuse angle. The first part 41 has a first outer screwing portion 411 formed on an outer wall of the first part 41, the second part 42 has a second outer screwing portion 421 formed on an outer wall of the second part 42.

As shown in FIGS. 4 and 6, the first sleeve 5 includes a first inner screwing portion 51 formed on an inner wall of the first sleeve 5 and corresponding to the first outer screwing portion 411, the first inner screwing portion 51 has a first limitation portion 52 arranged on an upper end of the first inner screwing portion 51, and the first sleeve 5 includes a first cutout 53 formed thereon so as to accommodate a first screw bolt 54.

As illustrated in FIGS. 4-6, the first threaded pipe 6 includes a first coupling section 61, a first nut section 62, and a second coupling section 63, two ends of the first nut section 62 are in communication with the first coupling section 61 and the second coupling section 63 respectively, the first coupling section 61 has at least one first recessed portion 611 and a first groove 612 which are formed on an outer wall of the first coupling section 61. The first coupling section 61 has a first shoulder 613 formed around a bottom thereof and is accommodated in the first part 41, and the first sleeve 5 is fitted on the first coupling section 61 and the first part 41. The first recessed portion 611 is fitted with a first ring 64, the first shoulder 613 has a first upper gasket 65 fitted thereon, a first lower gasket 651 is defined between a bottom of the first coupling section 61 and the first part 41 so that the first part 41 is connected with the first coupling section 61 tightly. The second coupling section 63 has a first threaded connection portion 631 formed on an outer wall of the second coupling section 63, and the first groove 612 has two first loops 66 mounted thereon.

In assembly, the first inner screwing portion 51 of the first sleeve 5 is screwed with the first outer screwing portion 411 so that the first limitation portion 52 of the first sleeve 5 abuts against the two first loops 66, the first screw bolt 54 is inserted into the first cutout 53 to abut against the first outer screwing portion 411 so as to avoid a removal of the first sleeve 5 from the first threaded pipe 6. The first limitation portion 52 abuts against the two first loops 66 so that the first threaded pipe 6 is rotated relative to the first part 41 in a first rotation direction.

Referring to FIGS. 4-6, the second sleeve 7 includes a second inner screwing portion 71 corresponding to the second outer screwing portion 421, the second inner screwing portion 71 has a second limitation portion 22 arranged on an upper end thereof, and the second sleeve 7 includes a second cutout 73 formed thereon so as to accommodate a second screw bolt 74.

As illustrated in FIGS. 4-6, the second threaded pipe 8 includes a second nut section 81 and a second coupling section 82 communicating with the second nut section 81, a second angle θ2 is defined between the second nut section 81 and the second coupling section 82, wherein the second angle θ2 is an obtuse angle. The second nut section 81 has a second threaded connection portion 811 formed on an inner wall of the second nut section 81, the second coupling section 82 has at least one second recessed portion 821 and a second groove 822 which are formed on an outer wall of the second coupling section 82. The second coupling section 82 has a second shoulder 823 formed around a top thereof and is accommodated in the second part 42, each of the at least one second recessed portion 821 is fitted with a second ring 83, the second shoulder 823 has a second lower gasket 84 fitted thereon, and a second upper gasket 841 is defined between a top of the second coupling section 82 and the second part 42 so that the second part 42 is connected with the second coupling section 82 tightly, and the second groove 822 are engaged with two second loops 85.

In assembly, the second inner screwing portion 71 of the second sleeve 7 is screwed with the second outer screwing portion 421 so that the second limitation portion 72 abuts against the two second loops 85, and the second screw bolt 74 is inserted into the second cutout 73 to abut against the second outer screwing portion 421, thus avoiding a removal of the second sleeve 7 from the second threaded pipe 8. Since the second limitation portion 72 abuts against the two second loops 85, the second threaded pipe 8 is rotated relative to the second part 42 in a second rotation direction different from the first rotation direction.

Thereby, the gas pipe joint 200 is connected easily, and the connection pipe 4, the first threaded pipe 6, and the second threaded pipe 8 have a fixed specification so as to reduce fabrication cost. Preferably, the first sleeve and the second sleeve have a fixed specification to mate with the first ring, the second ring, and the multiple gaskets, thus reducing maintenance cost as replacing the gas pipe joint 200.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention

What is claimed is:

1. A gas pipe joint comprising: a connection pipe, a first threaded pipe, and a second threaded pipe:
   the connection pipe including a first part and a second part communicating with the first part, and a first angle being defined between the first part and the second part; the first part having a first threaded orifice defined on a side surface of the first part adjacent to the second part, the second part having a second threaded orifice formed on a side surface of the second part proximate to the first part, the first threaded orifice being configured to removably screw with a first screw bolt, and the second threaded orifice being configured to removably screw with a second bolt;
   the first threaded orifice having a first notch defined on a peripheral side of the first threaded orifice, the second threaded orifice having a second notch formed on a peripheral side of the second threaded orifice, the first notch being configured to receive a first stopper, and the second notch being configured to accommodate a second stopper;
   the first threaded pipe including a first coupling section, a first nut section, and a second coupling section, two ends of the first nut section being in communication with the first coupling section and the second coupling section respectively, the first coupling section having at least one first recessed portion and a first groove which are formed on an outer wall of the first coupling section, the first coupling section having a first shoulder formed around a bottom of the first coupling section and being accommodated in the first coupling section, each of the at least one first recessed portion being fitted with a first ring, the first shoulder having a first upper gasket fitted on the first shoulder, and a first lower gasket being defined between a bottom of the first coupling section and the first part so that the first part is connected with the first coupling section tightly, the second coupling section having a first screwing portion formed on an outer wall of the second coupling section, and the first groove corresponding to the first threaded orifice;
   the second threaded pipe including a second nut section and a third coupling section communicating with the second nut section, a second angle being defined between the second nut section and the third coupling section, the second nut section having a second screwing portion formed on an inner wall of the second nut section, the third coupling section having at least one second recessed portion and a second groove which are formed on an outer wall of the third coupling section, the third coupling section having a second shoulder formed around a top of the third coupling section and being accommodated in the second part, each of the at least one second recessed portion being fitted with a second ring, the second shoulder having a second lower gasket fitted on the second shoulder, a second upper gasket being defined between a top of the second coupling section and the second part so that the second part is connected with the third coupling section tightly;
   wherein the first groove has two first loops mounted thereon; the second groove has two second loops mounted thereon; the first screw bolt is configured to stop the two first loops, the second bolt is configured to stop the two second loops; the first threaded pipe is rotated relative to the first coupling section by ways of the two first loops; and the second threaded pipe is rotated relative to the second part.

2. A gas pipe joint comprising: a connection pipe, a first sleeve, a first threaded pipe, a second sleeve, and a second threaded pipe;
   the connection pipe being a two-way pipe, and the connection pipe including a first part and a second part communicating with the first part, a first angle being defined between the first part and the second part; the first part having a first outer screwing portion formed on an outer wall of the first part, the second part having a second outer screwing portion formed on an outer wall of the second part;
   the first sleeve including a first inner screwing portion formed on an inner wall of the first sleeve and corresponding to the first outer screwing portion, the first inner screwing portion having a first limitation portion arranged on an upper end of the first inner screwing portion, and the first sleeve including a first cutout formed thereon so as to accommodate a first screw bolt;
   the first threaded pipe including a first coupling section, a first nut section, and a second coupling section, two ends of the first nut section being in communication with the first coupling section and the second coupling section respectively, the first coupling section having at least one first recessed portion and a first groove which are formed on an outer wall of the first coupling section; the first coupling section having a first shoulder formed around a bottom of the first coupling section and being accommodated in the first part, and the first sleeve being fitted on the first coupling section and the first part, the first recessed portion being fitted with a first ring, the first shoulder having a first upper gasket fitted thereon, a first lower gasket being defined between a bottom of the first coupling section and the first part so that the first part is connected with the first coupling section tightly, the second coupling section having a first threaded connection portion formed on an outer wall of the second coupling section, and the first groove having two first loops mounted on the first groove;
   in assembly, the first inner screwing portion of the first sleeve being screwed with the first outer screwing portion so that the first limitation portion of the first sleeve abuts against the at least one first loop, the first screw bolt being inserted into the first cutout to abut against the first outer screwing portion so as to avoid a removal of the first sleeve from the first threaded pipe, and the first limitation portion abutting against the two first loops so that the first threaded pipe is rotated relative to the first part;
   the second sleeve including a second inner screwing portion corresponding to the second outer screwing portion, the second inner screwing portion having a second limitation portion arranged on an upper end of the second inner screwing portion, and the second sleeve including a second cutout formed thereon so as to accommodate a second screw bolt;
   the second threaded pipe including a second nut section and a second coupling section communicating with the second nut section, a second angle being defined between the second nut section and the second coupling section; the second nut section having a second threaded connection portion formed on an inner wall of the second nut section, the second coupling section having at least one second recessed portion and a second groove which are formed on an outer wall of the second coupling section, the second coupling section having a second shoulder formed around a top of the second coupling section and being accommodated in the second part, each of the at least one second recessed portion being fitted with a second ring, the second shoulder having a second lower gasket fitted on the second shoulder, and a second upper gasket being defined between a top of the second coupling section and the second part so that the second part is connected with the second coupling section tightly, and the second groove are engaged with two second loops;

in assembly, the second inner screwing portion of the second sleeve being screwed with the second outer screwing portion so that the second limitation portion abuts against the two second loops, and the second screw bolt being inserted into the second cutout to abut against the second outer screwing portion, thus avoiding a removal of the second sleeve from the second threaded pipe, and the second limitation portion abutting against the two second loops, the second threaded pipe being rotated relative to the second part.

3. The gas pipe joint as claimed in claim 1, wherein the first angle is an obtuse angle.

4. The gas pipe joint as claimed in claim 2, wherein the first angle is an obtuse angle.

5. The gas pipe joint as claimed in claim 1, wherein the second angle is an obtuse angle.

6. The gas pipe joint as claimed in claim 2, wherein the second angle is an obtuse angle.

* * * * *